United States Patent
Bernadot et al.

(10) Patent No.: US 7,347,236 B2
(45) Date of Patent: Mar. 25, 2008

(54) SUPPORT FOR A TIRE TREAD

(75) Inventors: Patrick Bernadot, Romagnat (FR); Sebastian Drap, Dallet (FR); Michael Cogne, Clermont-Ferrand (FR)

(73) Assignee: Michelin Recherche et Technique, S.A. (CH)

( * ) Notice: Subject to any disclaimer, the term of this patent is extended or adjusted under 35 U.S.C. 154(b) by 399 days.

(21) Appl. No.: 10/392,082

(22) Filed: Mar. 19, 2003

(65) Prior Publication Data

US 2003/0168142 A1 Sep. 11, 2003

Related U.S. Application Data

(63) Continuation of application No. PCT/EP00/07484, filed on Jun. 29, 2001.

(30) Foreign Application Priority Data

Sep. 21, 2000 (FR) .................................. 00 12067

(51) Int. Cl.
*B60C 17/06* (2006.01)
*B60C 17/04* (2006.01)
(52) U.S. Cl. .................................. 152/158; 152/520
(58) Field of Classification Search ................. 152/158, 152/520
See application file for complete search history.

(56) References Cited

U.S. PATENT DOCUMENTS

| 4,248,286 | A | * | 2/1981 | Curtiss et al. | ............... 152/158 |
| 4,281,700 | A | | 8/1981 | Ross | |
| 6,076,578 | A | | 6/2000 | Michelot et al. | |
| 6,286,574 | B1 | | 9/2001 | Michelot et al. | |
| 6,463,972 | B1 | | 10/2002 | Lacour | |
| 6,598,633 | B1 | * | 7/2003 | Pompier et al. | ............ 152/158 |
| 6,779,572 | B2 | * | 8/2004 | Tabor et al. | ............ 152/520 X |

FOREIGN PATENT DOCUMENTS

| EP | 0 020 150 A1 | 12/1980 |
| EP | 0 721 854 A1 | 7/1996 |
| EP | 1 000 774 A1 | 5/2000 |
| WO | 99/22953 | 5/1999 |

* cited by examiner

*Primary Examiner*—Adrienne C. Johnstone
(74) *Attorney, Agent, or Firm*—E. Martin Remick; Frank J. Campigotto; Carolyn G. Uldrick

(57) ABSTRACT

A support for a tire tread band comprising an outer portion for contacting a tread and a base, wherein the base comprises a reinforcement framework having at least two plies of reinforcement elements. Each of the plies has mutually parallel reinforcement elements, and said elements are crossed from one ply to a next ply. The support further comprising a polymer material having a modulus greater than 30 MPa.

11 Claims, 1 Drawing Sheet

SUPPORT FOR A TIRE TREAD

CROSS-REFERENCE TO RELATED APPLICATIONS

This application is a continuation of International Application No. PCT/EP00/07484, filed 29 Jun., 2001 and published 28 Mar., 2002 as WO/02/24476A1 in the French language, and further claims priority to French Application No. 00/12067, filed Sep. 21, 2000.

BACKGROUND OF THE INVENTION

The present invention relates to the making of a support for a tire tread band used inside tires for supporting the load in the event of loss of inflation pressure. More precisely, it concerns supports having at their base a substantially non-extensible reinforcement framework produced by means of reinforcement elements of the type which can reinforce tires. It also concerns the methods of manufacturing such supports.

Patent application EP 0 796 747 describes a particular example of such a support, made from flexible material, for example based on saturated-chain elastomers such as EPDM rubber. FIG. 1 of this application and the corresponding passage in the description show and describe that the base of the bearing support is reinforced by elements disposed substantially circumferentially.

Different techniques of manufacturing a molded object are known: compression molding and materials transfer molding, and this category can include injection molding as well as flow molding. Compression molding assumes the introduction of the necessary volume of rubber inside the mould before closing it, whereas injection or flow molding assume the closure of the mould before the introduction of the volume of rubber or products required. Injection molding consists of injecting, into the closed mould, the material forming the final product under given conditions of pressure and temperature; as for flow molding, it differs from injection by the fact that the base products are introduced into the flow mould under precise operating conditions, said basic products reacting together in the mould in order to give the material of the finished product.

The different techniques involving the introduction of material into a closed mould do not lend themselves well to non-homogeneous finished products and in particular products reinforced by flexible reinforcement elements. These techniques are not well adapted when the reinforcements are wire or cable plies separated from each other: the rubber driven into the mould entrains with it the reinforcement elements or at least deforms and/or moves greatly the elements. Hence, it is practically impossible to ensure a precise positioning of said elements in the finished product and consequently to obtain correct, uniform and repeated reinforcement properties. This is one of the prime reasons why the technique of force feeding material into a closed mould, for rubber parts reinforced by wires or cables, has never shown itself to be advantageous and propitious for obtaining high-quality products. It is for example well known that normal tires, in spite of many attempts, are not currently injected or obtained by casting: one makes first a non-vulcanized or raw blank with a form fairly close to the final manufactured form where the blank includes the reinforcement elements inserted at the required places between the different layers of elastomer material. Then the molding is carried out by enclosing the molding elements of the vulcanization mould around the blank.

To resolve the problems of positioning the reinforcement elements during the manufacture of a support by a technique of force feeding material, application EP 1000774 proposes for the elements for reinforcing the base of said support the use of substantially no-extensible circumferential elements used in the form of a calendered ply made of rubber material with complementary reinforcement elements disposed, at least partly, radially outside the circumferential reinforcement elements and axially opposite the feed points disposed at the body of the support. Preferably, the complementary reinforcement elements comprise elements oriented with respect to the circumferential direction at an angle greater than 60° and also being in the form of a calendered ply of rubber material.

BRIEF SUMMARY OF THE INVENTION

The solution described above, in spite of the progress achieved in the precision necessary for the correct function and endurance of the support, is not optimum both from the point of view of mass reduction, industrial cost, and the endurance of the support. The invention proposes another solution, based on the choice of materials which are more propitious for conferring the required properties on the support. This solution combines the use of a framework for reinforcing the base of the support comprising a grid formed by reinforcement elements crossed over each other, in combination with the use, as material making up the support, of a polymer whose modulus is greater than 30 MPa. The modulus of the polymer is a secant extension modulus at a relative elongation of 10%, where the modulus is measured in accordance with ASTM 638 at 80° C.

The polymer used may be a plastomer or an elastomer. Advantageously, an elastomer is used whose elongation at break is greater than 200% at temperatures of between −30° C. and +80° C. The properties cited can be obtained, by way of examples, by means of the family of thermoplastic elastomers or polyurethane elastomers.

A thermoplastic elastomer is a linear elastomeric polymer having usage temperatures below 400° C. and whose rheological properties make it possible to envisage conversion methods such as injection or extrusion. In all cases, it has a structure including two incompatible phases, one containing the thermoplastic sequences of the chain which are thus dispersed in the elastomer phase. By way of non-limiting examples, it is necessary to cite:
 a) styrene-butadiene and styrene-isoprene sequenced copolymers,
 b) thermoplastic elastomers derived from polyolefins, physical mixtures of propylene homopolymer or copolymer with a non-vulcanized elastomer of the EPM or EPDM type (ethylene or propylene rubber),
 c) block amide polyethers-esters, linear and regular catenation of rigid polyamide segments and flexible polyether or polyester segments,
 d) elastomers of polyesters.

Polyurethane elastomers result from the reaction of an aromatic or aliphatic diisocyanate on a polyol (polyether or polyester) and may be classed in three major families: castables, thermoplastics, mixables, the first two families concerning the invention more particularly.

The term "grid" is intended to mean a reinforcement framework composed of at least one layer of at least two plies of reinforcement elements, parallel to each other in each ply and crossed from one ply to the next and making angles α and β with the circumferential direction. Preferentially, said angles are, respectively, α equal to zero or almost zero and β equal to or substantially equal to 90°. The elements are coated with a substance for obtaining a true bond at the crossing points between elements. The elements are separated from each other in each ply by a distance or pitch, measured perpendicularly to their common direction, greater than 5 mm, so that voids are present between elements in the grid as such.

The term "reinforcement element" means both a monofilament and an assembly of elementary filaments, of identical or distinct natures, such as strands and/or cables. The reinforcement elements of the grid are preferentially elements of glass fiber, a material that combines strength and lightness. The substance for coating the reinforcement elements of the grid plies is preferentially a resin. Said characteristics afford good cohesion of the grid with the polymeric material which will be injected or poured into the mould for manufacturing the support. Among coating resins are polyolefins such as, for example, polypropylene (PP), polyvinyl chlorides (PVC), and styrene copolymers such as styrene butadiene. Use will preferably be made of thermoset materials such as unsaturated epoxy and polyester resins.

The grid according to the invention can be obtained in several ways. The first embodiment consists of manufacturing, on a production drum, a cylindrical ring formed by two plies of bare reinforcement elements, and then soaking said ring in a chosen bath of resin, for example thermosetting. Thermosetting resin means a polymer whose liquid transition temperature is greater than 400° C., and the resins which can be envisaged may preferentially be epoxy resins. The resin used, by setting in the open air, provides the joining between the crossed elements of the plies of reinforcement elements. Several rings can then be disposed concentrically on each other and thus form the reinforcing support grid.

The second method consists of manufacturing the ring from at least two plies using elements precoated with the chosen resin and, as before, forming the ring on a drum. Said ring is then impregnated with a hot-melt binder, and wound several times in order to form the grid, the different windings being bonded together by fusion of the binder and its subsequent solidification. The binders whose use is preferential are vinyl acetates or ethylene-vinyl-acetate (EVA) copolymers, but can also be polyacrylics (PMMA) or polyolefins, such as for example polyethylene.

The bonding between windings may be necessary only at the start of the winding, when the starting winding edge is covered or at the end of winding when the ring is overlapped by the beginning winding edge: the binder required between the layers of rings is then produced by means of an appropriate glue. The glues can be polyurethanes and preferentially cyanoacrylics. The glue CYANOLITE is one of the best examples.

The use of a grid as described above confers on the framework for reinforcing the base of the support a practically perfect positioning, but its purpose is also to increase the strength of the grid vis-à-vis stresses imposed due either to the method of manufacture or to the functioning of the support when the mounted assembly is running. Said strength is all the better since the material making up the bearing support is capable of surrounding the grid homogeneously, such a possibility being procured by the method of manufacturing said support. Such a method, in accordance with the invention, consists of placing the grid described above, previously manufactured and with an axial width adapted to the width of the support base, on the core of a casting or injection mould, provided at its periphery with studs for positioning the grid, closing the mould and transferring inside said mould the polymeric material chosen or the ingredients necessary for forming said material.

BRIEF DESCRIPTION OF THE SEVERAL VIEWS OF THE DRAWINGS

The invention will be better understood by means of the drawing accompanying the description, illustrating a non-limitative example of the execution of a tire according to the invention, and which, associated with an adapted rim, forms a high-performance tire-rim assembly.

DETAILED DESCRIPTION OF THE INVENTION

Figure 1:
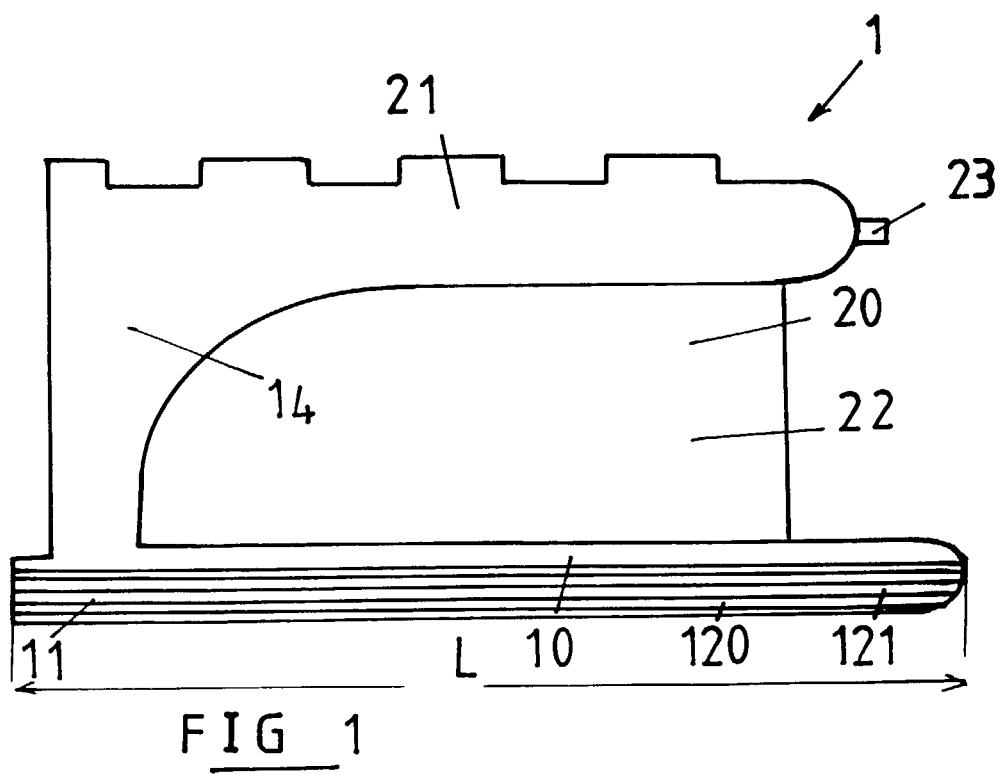
FIG. 1 depicts schematically a tread bearing support according to the invention.
Figure 2:
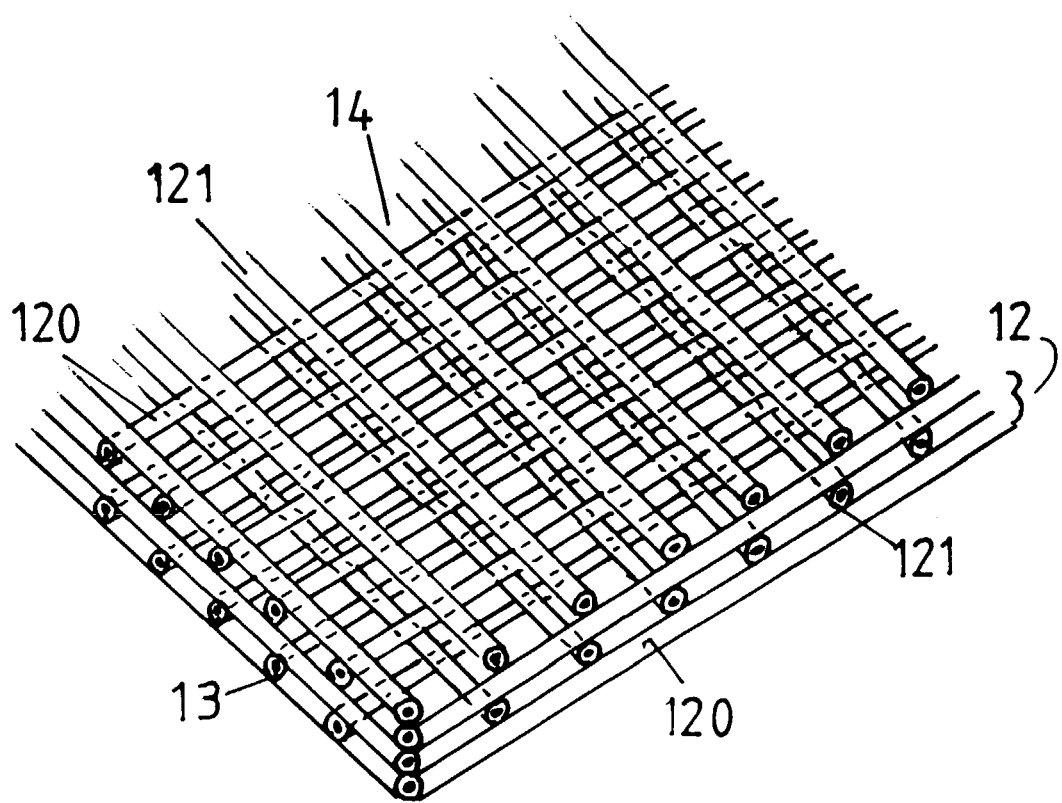
FIG. 2 depicts, seen in perspective, a grid composed of several rings.

FIG. 1 depicts in transverse section a tread bearing support according to the invention. Said support 1 comprises a base 10 and a body 20 with annular shapes overall. The body 20 comprises a crown 21 and a series of recesses 22 which extend axially in the central part of the body and open out on only one side. Said recesses are regularly distributed over the circumference of the body 20. The crown of the body also has protuberances 23 which are due to the production of the support by transferring material into a closed mould prior to the introduction of the material. Said protuberances indicate the presence of the material feed points, and are regularly distributed over the circumference of the crown 21.

The base 10 is reinforced by a grid 11 formed by two windings of a ring 12 composed of two plies, 120 and 121, of glass fiber cables, the radially innermost ply 120 having circumferentially oriented cables and the radially uppermost ply 121 having axially oriented cables. The cables are coated with a thermosetting resin 13 and in this case an epoxy resin, and the assembly of the two plies 120 and 121 at the crossing points of the cables of the two plies is effected, before winding on the drum making up said grid 11, by hardening the epoxy resin at room temperature under the action of ultraviolet radiation. The distance e between two coated cables, measured perpendicular to the common direction of the cables in the same ply 120 (or 121) and in the plane of said ply, is 10 mm, which is a pitch between cables allowing easy circulation of the injected material or casting charge 14 between cables in the transfer mould. A hot-melt binder, in this case a vinyl acetate, is sprayed on both sides of said ring 12. After winding over two turns on a ring manufacturing drum, the binder is molded by adding heat by means of a hot air stream obtained by an adapted means such as an industrial dryer, which then makes it possible, after a winding turn and by cooling, to join the reinforcement elements of the internal ply 120 of the ring 11 to the reinforcement elements of the external ply 121, which is then wound on the ply 120. The circumferential edge of the ring 120 which forms the start of the winding is, over a circumferential length 1, substantially equal to 1% of the internal circumference of the winding, glued to the internal face of the second winding by means of a glue such as CYANOLITE, which is placed on the reinforcement elements of the ring 12. The same applies to the end of the winding, which will be glued to the part of the ring which is internal to it, so that there is an overlap between the start and end of the winding.

The grid 11 thus obtained, of width L at least equal to the width 1 of the base 10 of the support minus 10 mm, and in the case described equal to said width 1, is placed on the cylindrical core of the injection or casting mould for the support, said core being provided on its periphery and more particularly in its central region with so-called positioning studs or keys for the grid 11. Said studs serve as a spacing support for the grid 11 and have a height such that said grid is, in the finished product consisting of the bearing support 1, situated radially substantially at the middle of the base 10 of the support. The space thus created between the external face of the core and the internal face of the reinforcement grid 11, corresponding to the height of the studs, between 0.5 and 2 mm according to the support dimensions, is filled evenly with the filling material of the mould, which results in an improvement to the mechanical anchoring of the grid in the material of the support 1, but also and more particularly to an increase in the strength of the grid 11 of the base 10 of the support 1 on deformation or buckling during the circumferential shrinkage of the support 1 taken out of the mould.

In the case of a grid width less than the width 1 of the base of the support, it is also possible, before injection or pouring of the polymeric material, to ensure the holding of the framework by means of the expansibility of the core of the injection mould; the grid is then put under sufficient tension to be held during injection or casting.

The invention claimed is:

1. A support for a tire tread band comprising a polymer material having a modulus greater than 30 MPa, an outer portion for contacting a tread and a base, wherein said base comprises;
   a grid comprising at least one layer of at least two plies of reinforcement elements, each of said plies having mutually parallel reinforcement elements, and said elements are crossed from one ply to a next ply and making angles α and β with a circumferential direction;
   wherein said reinforcement elements are separated from each other in each ply by a distance between elements greater than about 5 mm, measured perpendicularly to their common direction, so that voids are present between said elements in said grid, and said material fills said voids.

2. The support according to claim 1, wherein said reinforcement elements form an angle relative to the circumferential direction substantially equal to 0° in said one ply and substantially equal to 90° in said next ply.

3. The support according to claim 2, wherein said material further comprises an elastomer.

4. The support according to claim 3, wherein said elastomer has an elongation at break greater than 200%.

5. The support according to claim 3 wherein said material comprises a thermoplastic elastomer.

6. The support according to claim 3 wherein said material comprises a polyurethane elastomer.

7. The support according to claim 1 wherein said reinforcement elements comprise glass fiber elements.

8. The support according to claim 1 wherein said grid has an axial length L at least equal to a width of said base of said support minus 10 mm.

9. The support according to claim 1 wherein said reinforcement elements further comprise a resin coating for obtaining a bond at the points of intersection between said elements.

10. The support according to claim 1, wherein said grid is formed having two plies of glass fiber cables coated with an epoxy resin so that a bond is obtained by hardening said epoxy resin at room temperature under the action of ultraviolet radiation.

11. The support according to claim 1, wherein a pitch distance between two reinforcement elements measured perpendicular to the common direction of the reinforcement elements in the same ply and in the plane of the ply is 10 millimeters.

* * * * *